United States Patent
Wang

(10) Patent No.: US 10,041,557 B2
(45) Date of Patent: Aug. 7, 2018

(54) MULTI-DIRECTIONAL DAMPING DEVICE

(71) Applicant: Wen-Tzu Wang, Taichung (TW)

(72) Inventor: Wen-Tzu Wang, Taichung (TW)

(*) Notice: Subject to any disclaimer, the term of this patent is extended or adjusted under 35 U.S.C. 154(b) by 0 days.

(21) Appl. No.: 15/361,497

(22) Filed: Nov. 28, 2016

(65) Prior Publication Data

US 2018/0094686 A1   Apr. 5, 2018

(51) Int. Cl.
*B60G 11/02* (2006.01)
*F16F 1/18* (2006.01)
*F16F 15/073* (2006.01)

(52) U.S. Cl.
CPC ............ *F16F 1/185* (2013.01); *F16F 15/073* (2013.01)

(58) Field of Classification Search
CPC ......... F16F 1/185; F16F 15/073; B60G 11/02; B60G 11/08; B60G 11/36
USPC ............ 261/36.1, 37.2, 260, 272, 283
See application file for complete search history.

(56) References Cited

U.S. PATENT DOCUMENTS

| | | | | |
|---|---|---|---|---|
| RE15,018 E * | 1/1921 | Hassler | | |
| 2,626,799 A * | 1/1953 | Howell | ............ | F16F 1/02 267/165 |
| 2,695,104 A * | 11/1954 | De Remer | ............ | D06F 37/245 137/624.11 |
| 3,324,690 A * | 6/1967 | Button | ............ | D06F 377/304 68/133 |
| 3,738,445 A * | 6/1973 | Wilson | ............ | G01V 1/181 267/160 |
| 4,619,349 A * | 10/1986 | Braun | ............ | B64C 27/001 188/380 |
| 5,078,371 A * | 1/1992 | Joseph | ............ | B60G 11/52 267/156 |
| 7,018,092 B2 * | 3/2006 | Muller | ............ | G04B 17/063 267/272 |
| 2006/0075789 A1 * | 4/2006 | Lee | ............ | D06F 37/40 68/12.24 |

FOREIGN PATENT DOCUMENTS

DE    2912673 A1 *  3/1980
JP    403133728 A *  8/1991

* cited by examiner

*Primary Examiner* — Pamela Rodriguez

(57) ABSTRACT

A multi-directional damping device includes a supporting element, an annular frame extending around the supporting element, and at least one elastic element extending between the supporting element and the annular frame. The elastic element includes an end connected to the supporting element, another end connected to the annular frame, and several segments formed between the ends and adapted for absorbing vibration at different frequencies. The elastic element bears the weight of the supporting element and that of the annular frame and retains in position between the supporting element and the annular frame. The segments of the elastic element vibrate at the frequencies when the supporting element or the annular frame vibrates.

2 Claims, 12 Drawing Sheets

US 10,041,557 B2

MULTI-DIRECTIONAL DAMPING DEVICE

BACKGROUND OF INVENTION

1. Field of Invention

The present invention relates to a multi-directional damping device and, more particularly, to a multi-directional damping device adapted for absorbing energy of horizontal and vertical vibration.

2. Related Prior Art

A machine that includes a motor is often equipped with a damping device. A typical damping device includes a rubber laminate as an elastic load-bearing element. When the machine is subject to energy caused by vertical vibration and/or horizontal displacement, the elastic load-bearing element is subject to stress that tends to damp the vertical vibration and/or horizontal displacement. Thus, the elasticity of the elastic load-bearing element is used for absorbing the energy of the vibration. The damping device exhibits good adhesiveness and bears fierce vibration in a short period of time after the machine is made. However, the damping device is subject to heavy loads because it located beneath the machine. Hence, the damping device, which is made of rubber, will soon suffer permanent deformation. Heat and moisture further comprise the life of the damping device.

Moreover, a vehicle such as a bicycle, a skate board and a trolley includes a frame and wheels. Weight of a person or cargo supported on the frame is transferred to the wheels via axles. Each of the wheels and the ground exert a normal force on each other, thereby retailing friction between them when there is an attempt to move them relative to each other. The wheels roll when the vehicle moves. The wheels take intensive hits from the ground when they roll over a pothole or bump into something on the ground. The hits are transferred to the person or cargo. The person might feel uncomfortable or the cargo might be damaged.

The present invention is therefore intended to obviate or at least alleviate the problems encountered in prior art.

SUMMARY OF INVENTION

It is the primary objective of the present invention to provide a multi-directional damping device that is not limited to an axial direction, absorbs energy of vibration caused by instantaneous vertical or horizontal displacement, and automatically returns to an original position.

To achieve the foregoing objective, A multi-directional damping device includes a supporting element, an annular frame extending around the supporting element, and at least one elastic element extending between the supporting element and the annular frame. The elastic element includes an end connected to the supporting element, another end connected to the annular frame, and several segments formed between the ends and adapted for absorbing vibration at different frequencies. The elastic element bears the weight of the supporting element and that of the annular frame and retains in position between the supporting element and the annular frame.

Advantageously, the segments of the elastic element vibrate at the frequencies when the supporting element or the annular frame vibrates. Thus, the damping device can effectively absorb vibration at different frequencies.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein:

FIG. 11 is an enlarged cross-sectional view of the multi-directional damping device shown in FIG. 1, showing an elastic element attached to the supporting element by a threaded bolt in;

DETAILED DESCRIPTION OF PREFERRED EMBODIMENT

Figure 1:
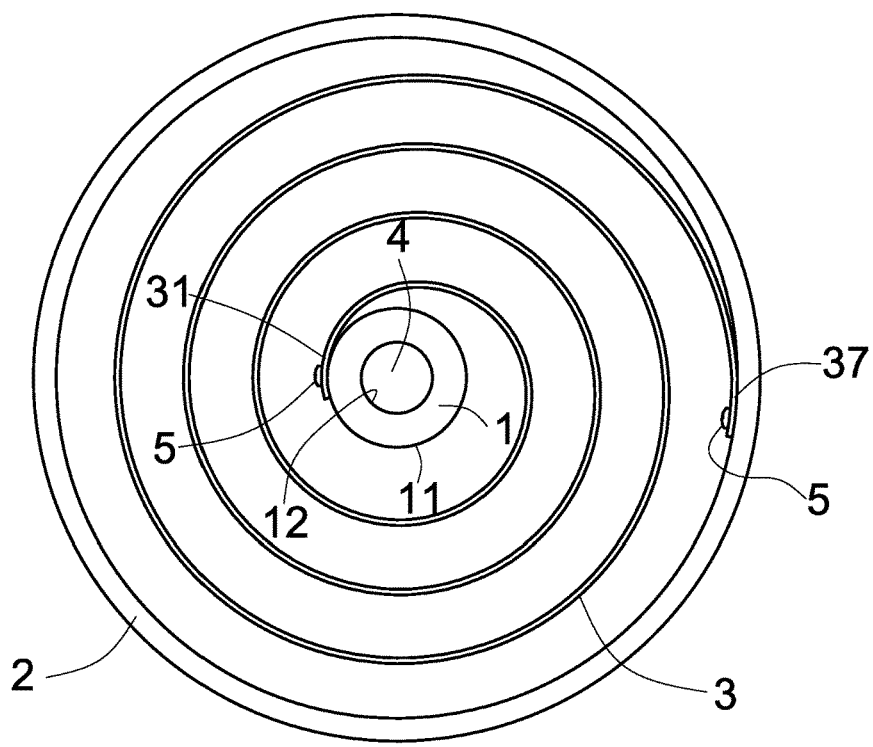
FIG. 1 is a front view of a multi-directional damping device according to the preferred embodiment of the present invention.
Figure 2:
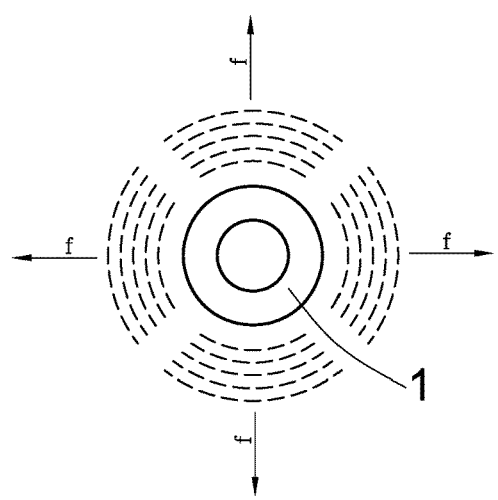
FIG. 2 is a front view of a supporting element of the multi-directional damping device shown in FIG. 1.

Referring to FIGS. 1 and 2, a multi-directional damping device includes a supporting element 1, an annular frame 2 and at least one elastic element 3 according to the preferred embodiment of the present invention. Preferably, the multi-directional damping device includes several elastic elements 3d as shown in FIG. 13. However, only one elastic element 3 is shown in FIGS. 1 through 12.

The supporting element 1 is connected to a structure 4 that vibrates at a basic frequency f and needs damping. Thus, the supporting element 1 absorbs energy of vibration from the structure 4. The supporting element 1 includes a periphery 11 and an internal face 12. The internal face 12 is connected to the structure 4.

Figure 12:
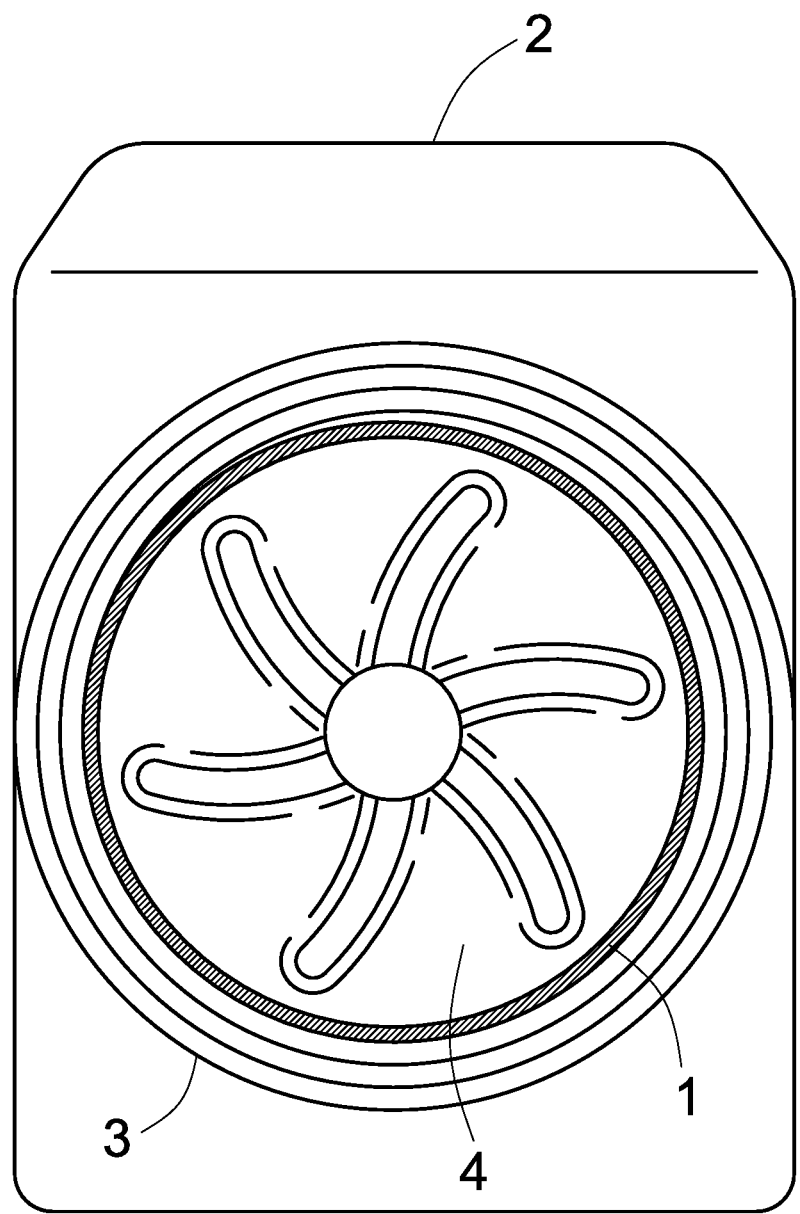
FIG. 12 is a front view of a drum-type washing machine using the multi-directional damping device shown in FIG. 1.
Figure 13:
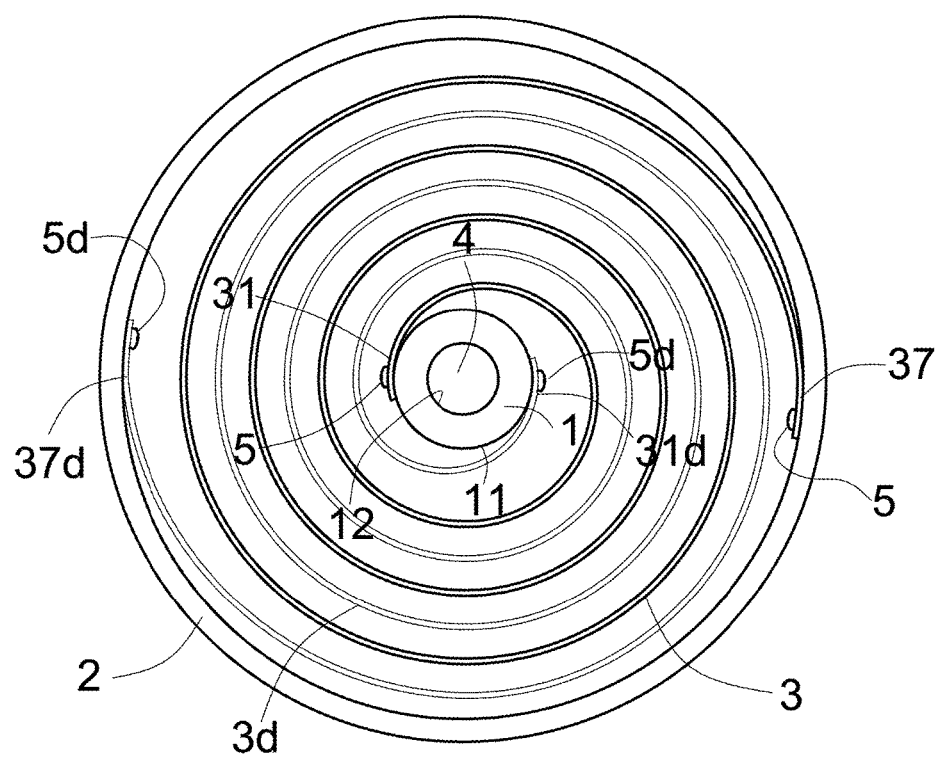
FIG. 13 is a front view of a multi-directional damping device including several elastic elements according to the preferred embodiment of the present invention.

The annular frame 2 is a rigid ring such as shown in FIG. 1 or a frame of a machine such as shown in FIG. 12. The annular frame 2 is located around the periphery 11 of the supporting element 1.

The elastic element 3 is arranged between the supporting element 1 and the annular frame 2. The elastic element 3 includes an end connected to the supporting element 1 and another end connected to the annular frame 2. The elastic element 3 bears the weight of the supporting element 1 and that of the annular frame 2 and, at the same time, retains its position between the supporting element 1 and the annular frame 2.

Figure 3:
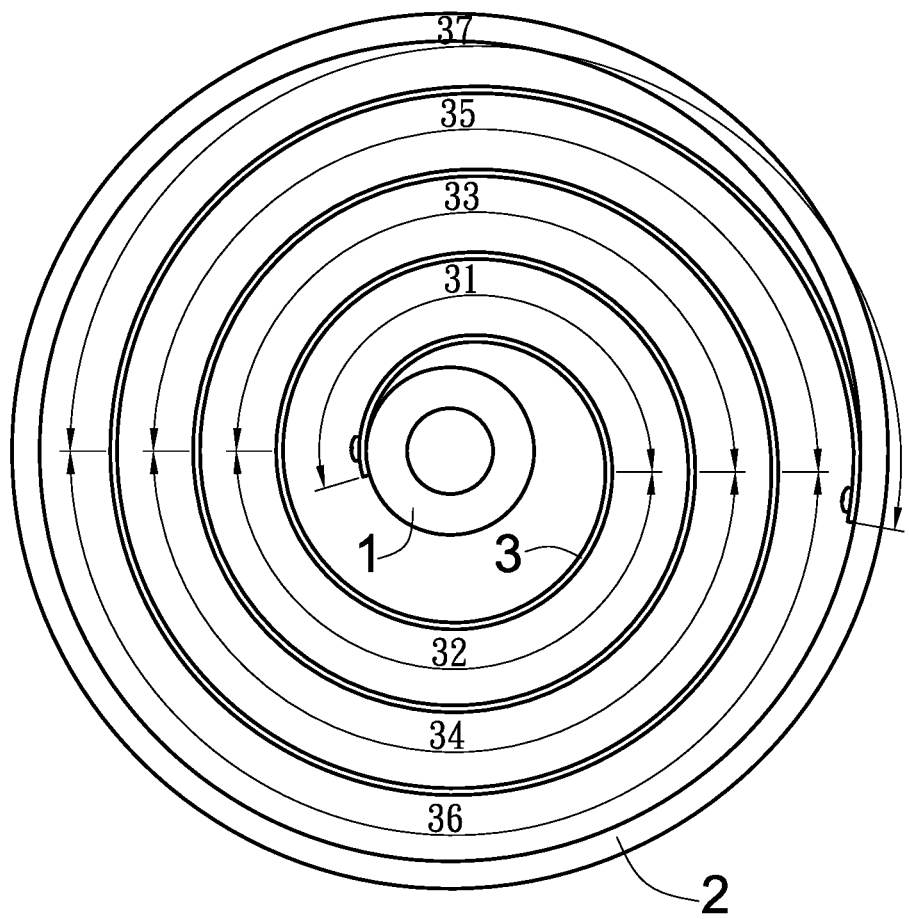
FIG. 3 is another front view of the multi-directional damping device shown in FIG. 1, showing seven (7) zones.
Figure 4:
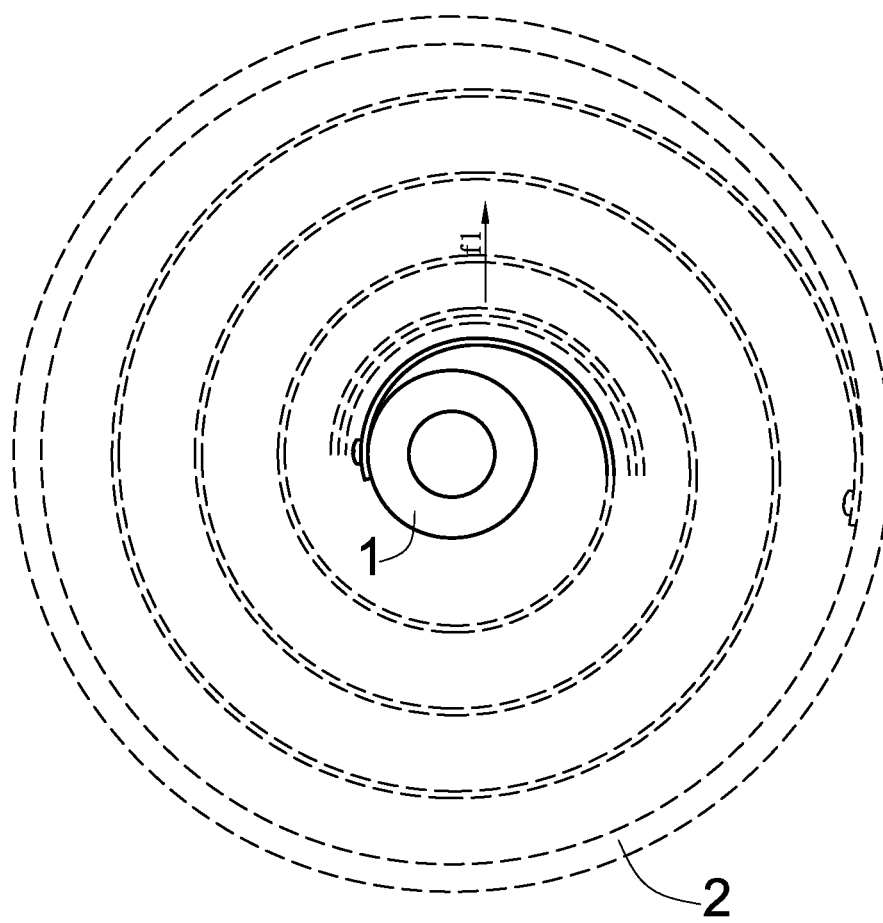
FIGS. 4 to 10 are front views of the elastic element shown in FIG. 1 subject to seven (7) degrees of vibration.
Figure 5:
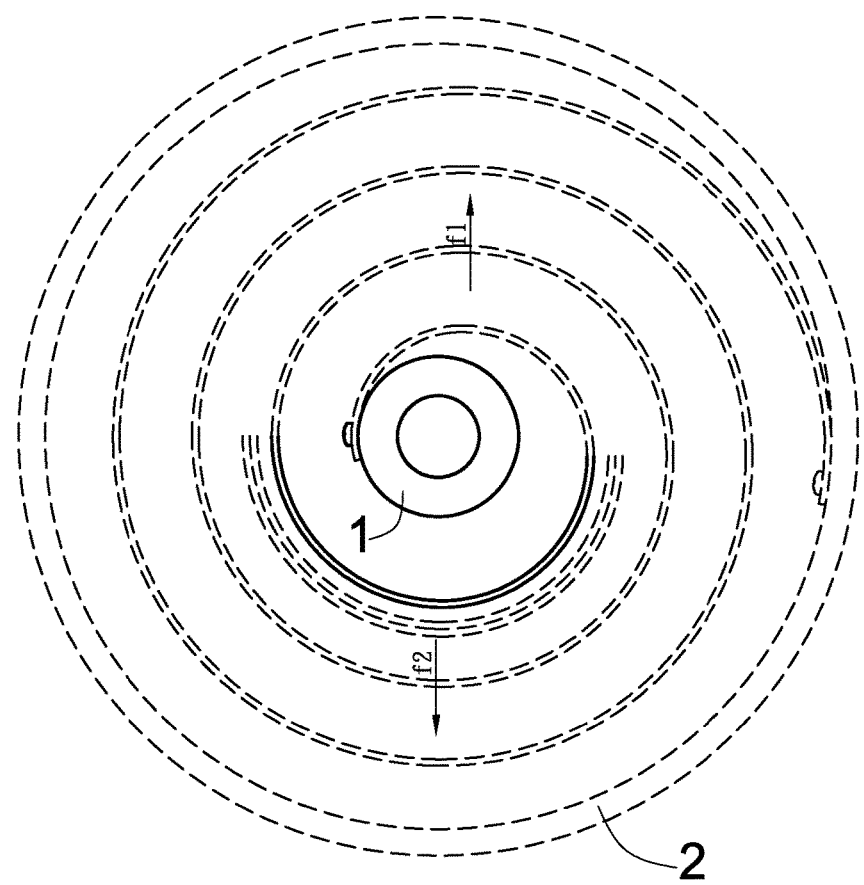
Figure 6:
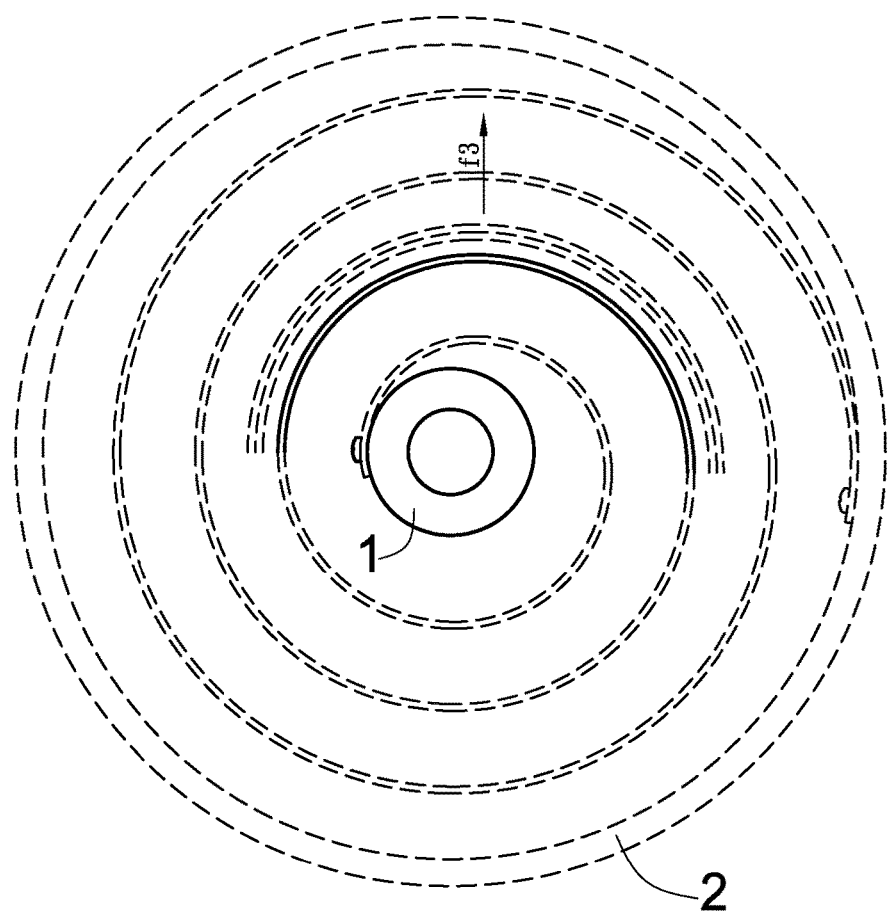
Figure 7:
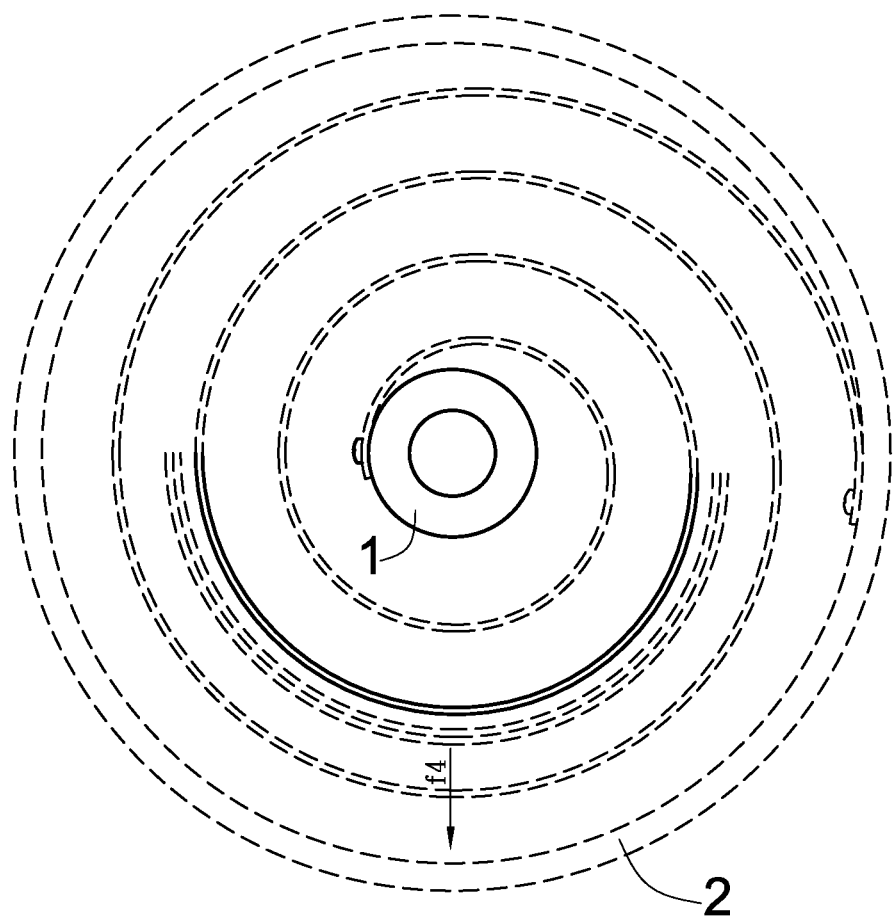
Figure 8:
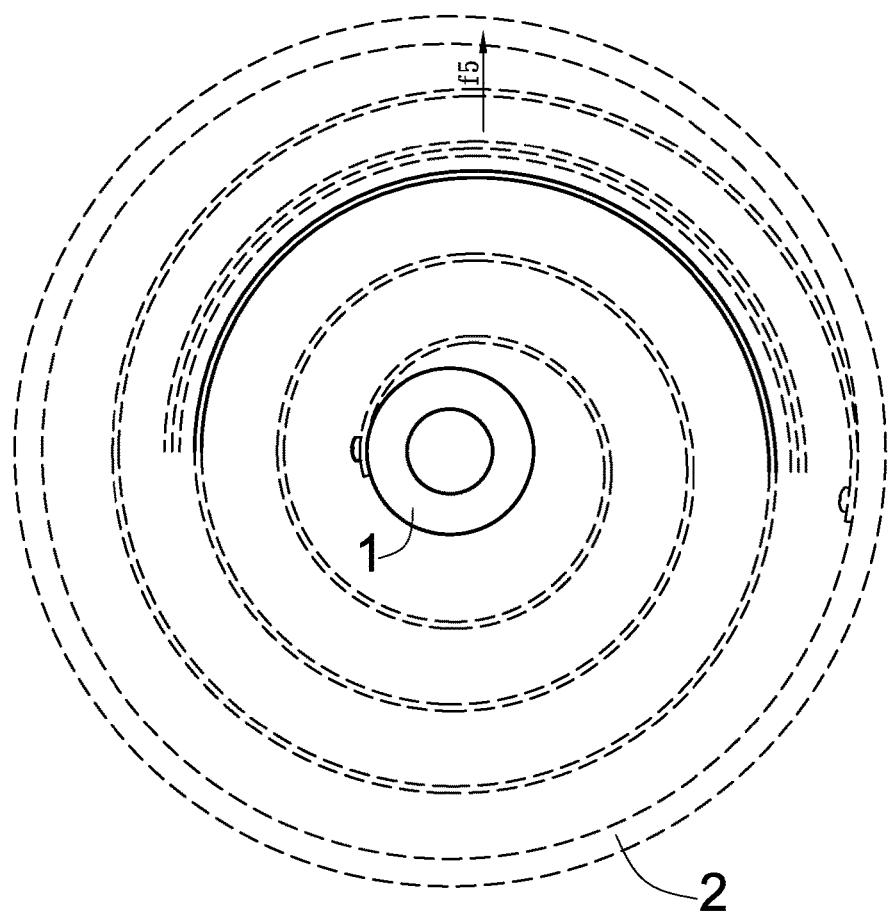
Figure 9:
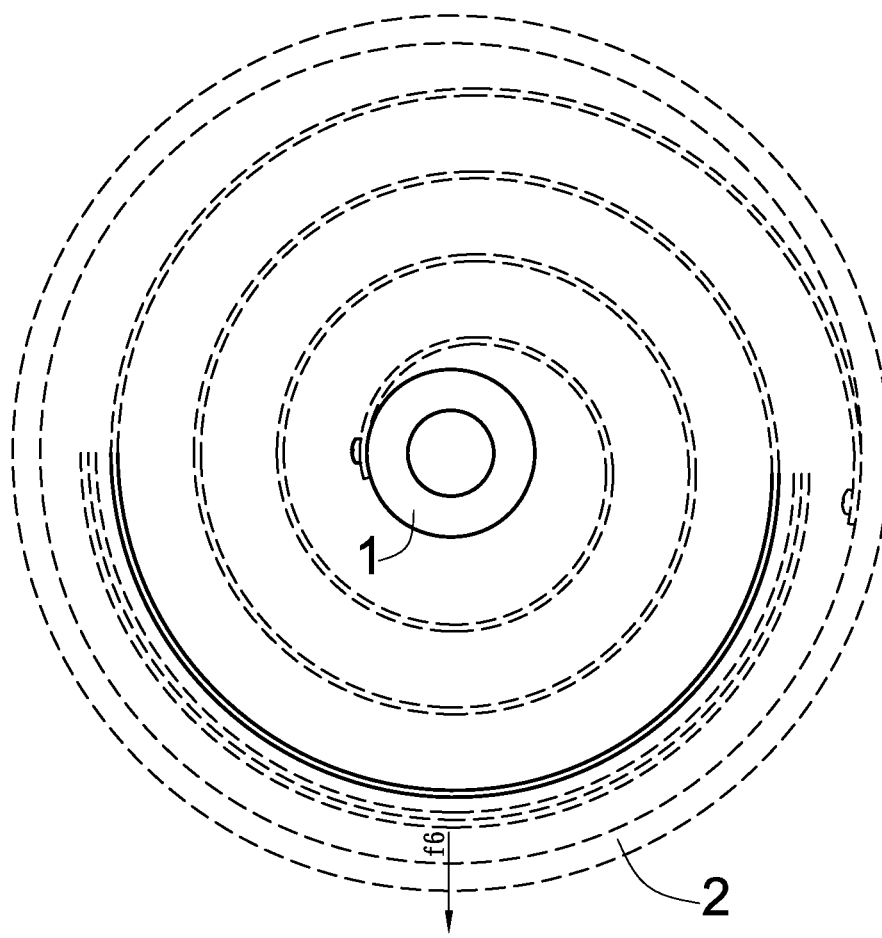
Figure 10:
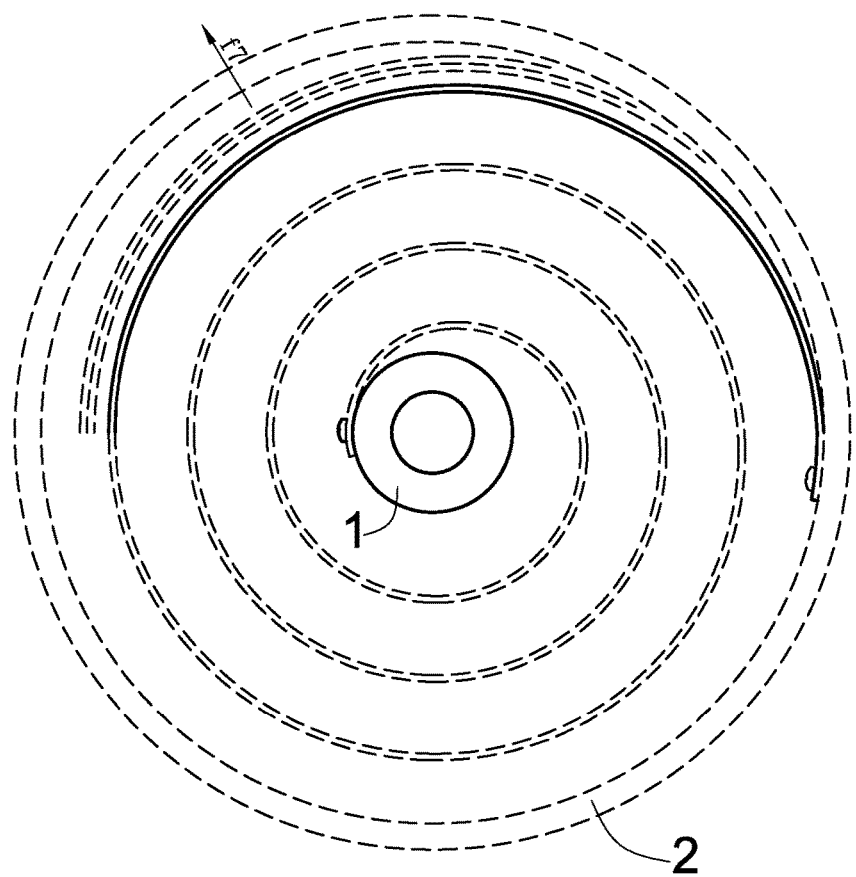
Figure 11:
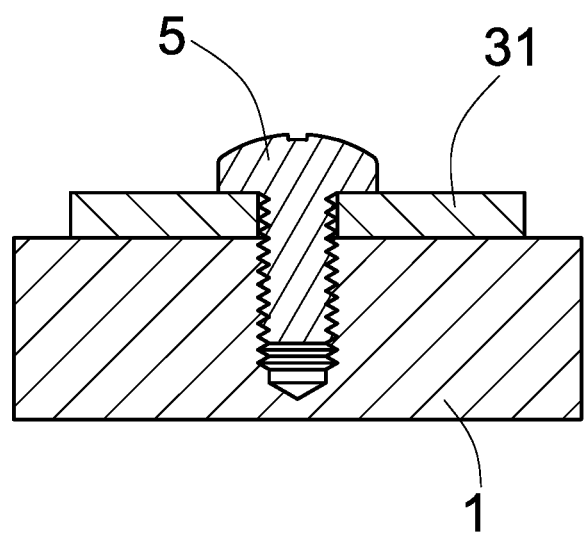

Referring to FIG. 3, the elastic element 3 includes seven segments 31, 32, 33, 34, 35, 36 and 37 with different sizes adapted for absorbing vibration at different frequencies (see also elements 31d and 37d shown in FIG. 13). When the supporting element 1 or the annular frame 2 vibrates, the segments 31, 32, 33, 34, 35, 36 and 37 of the elastic element 3 vibrate or reciprocate at different frequencies to absorb the vibration.

In the making of the damping device of the present invention, the thickness or width of the segments 31, 32, 33, 34, 35, 36 and 37 of the elastic element 3, the damping of the segments 31, 32, 33, 34, 35, 36 and 37 of the elastic element 3 or the coefficients of elasticity can be changed to change the frequency of the elastic element 3. Preferably, the frequency of the elastic element 3 is changed by changing the thickness or width of the elastic element 3, and the damping or coefficient of elasticity of each of the segments 31, 32, 33, 34, 35, 36 and 37 of the elastic element 3 is changed by changing a radius by which the segment extends.

When the structure 4 is subject to an external force, or the structure 4 is a machine connected to a motor in operation such as the washing machine shown in FIG. 12, the structure 4 vibrates at or near the basic frequency f. The segments 31 through 37 are adapted for vibration at the frequencies f1 through f7 in directions f1 through f7 and in reversed resonance with the structure 4. Thus, the segments 31 through 37 absorb energy of vibration from the structure 4 and turn it into kinetic energy thereof. Thus, the vibration of the structure 4 is damped.

Referring to FIGS. 4 through 10, the frequencies of vibration to be absorbed by the segments 32, 33, 34, 35, 36 and 37 can be changed by changing their radius, thickness or width of the segments 32, 33, 34, 35, 36 and 37. Thus, the segments 32, 33, 34, 35, 36 and 37 are adapted for reversed resonance at frequencies f2, f3, f4, f5, f6 and f7 that are close to the basic frequency f with the structure 4. The frequencies F2 to F7 are marginally smaller than the frequency f1 and gets smaller sequentially. Thus, the frequencies f1 to f7 together form a vibration bandwidth.

The elastic element 3 is a spiral leaf spring. An end of the segment 31 of the elastic element 3 is connected to the periphery 11 of the supporting element 1. An end of the segment 37 of the elastic element 3 is connected to an annular face of the annular frame 2. The elastic element 3 includes an end connected to the periphery 11 of the supporting element 1 by a threaded bolt 5 (or element 5d in FIG. 13) and another end connected to the internal face of the annular frame 2 by another threaded bolt 5 (or element 5d in FIG. 13). Thus, the elastic element 3 exerts an elastic force on each of the supporting element 1 and the annular frame 2.

In the preferred embodiment shown in FIGS. 1 through 12, the supporting element 1, the annular frame 2 and the elastic element 3 are made one by molding, milling, machining or any other proper method. However, in another embodiment, the supporting element 1, the annular frame 2 and the elastic element 3 can be separately made and operatively connected to one another in any proper manner such as, but not limited to, conventional, microwave welding, fitting, coupling sleeves, threads, adhesion and buckles.

The segments 31 through 37 of the elastic element 3 are adapted for vibration at the frequencies f1 through f7 that together form a vibration bandwidth that includes the basic frequency f of the structure 4, and provide balanced damping. Thus, even if the basic frequency f of the structure 4 is not precisely calculated, or if the basic frequency f changes in the operation of the structure 4, the basic frequency f of the structure 4 will still fall in the vibration bandwidth provided by the elastic element 3. Therefore, the vibration of the structure 4 can still be damped efficiently and effectively, and the off-frequency effect reduced. Any number of elastic elements 3 can be used to provide a proper vibration bandwidth according to the present invention.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A multi-directional damping device, comprising:
   a supporting element, vibrating at a basic frequency;
   an annular frame located around the periphery of the supporting element; and
   at least one elastic element windingly extended between the supporting element and the annular frame, and comprising an end connected to the supporting element, another end connected to the annular frame, and several segments formed between the ends and adapted for absorbing vibration at different frequencies when one of the supporting element and the annular frame vibrates,
   wherein the elastic element bears the weight of the supporting element and that of the annular frame and remains in position between the supporting element and the annular frame,
   wherein the different frequencies form a vibration bandwidth including the basic frequency; and
   wherein, the different frequencies sequentially decrease as the radius of the several segments thereof in relation to the supporting element increases.

2. The multi-directional damping device according to claim 1, comprising several elastic elements.

* * * * *